United States Patent [19]

Davidson

[11] Patent Number: 4,929,957
[45] Date of Patent: May 29, 1990

[54] METHOD AND APPARATUS FOR DETECTING RECEIVER COMPRESSION IN MULTIPLE LOBE GUIDANCE SYSTEMS

[75] Inventor: Charles W. Davidson, Renton, Wash.

[73] Assignee: Sundstrand Data Control, Inc., Redmond, Wash.

[21] Appl. No.: 380,912

[22] Filed: Jul. 17, 1989

[51] Int. Cl.$^5$ ............................. G01S 1/16; G01S 1/18
[52] U.S. Cl. .................................................. 342/410
[58] Field of Search ............... 342/408, 407, 410, 412, 342/413

[56] References Cited

U.S. PATENT DOCUMENTS 3,911,437 10/1975 Ploussious .
4,193,075 3/1980 Blazek et al. .
4,635,064 1/1987 Chisholm .
4,789,864 12/1988 Aarseth .

Primary Examiner—Theodore M. Blum
Attorney, Agent, or Firm—Michael S. Yatsko; Trevor B. Joike

[57] ABSTRACT

A method and apparatus for detecting amplitude compression in a guidance system utilizes a transmitting system that transmits two pulses having a predetermined amplitude differential therebetween on each of a plurality of directional beams. The amplitudes of the pulses received from an individual one of the beams are compared, and if the amplitude differential between the received pulses is different than the predetermined amplitude differential of the transmitted pulses, a signal indicative of receiver compression is generated.

6 Claims, 2 Drawing Sheets

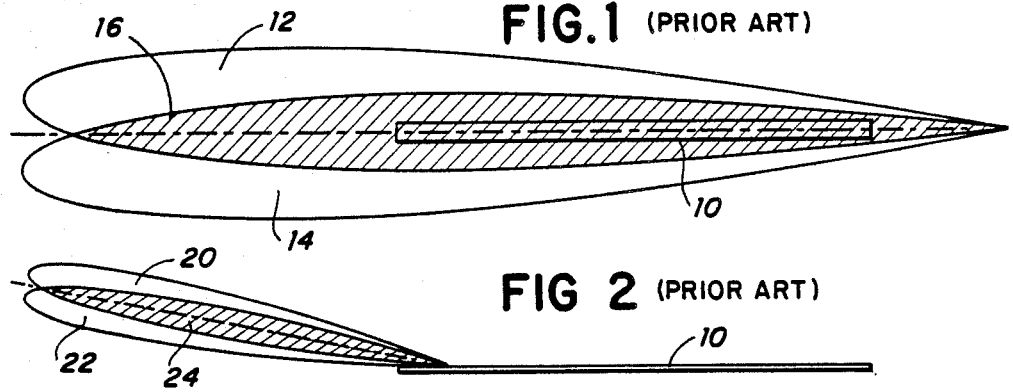
FIG. 1 (PRIOR ART)
FIG 2 (PRIOR ART)
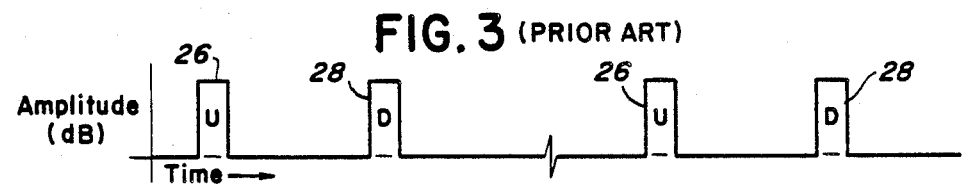
FIG. 3 (PRIOR ART)
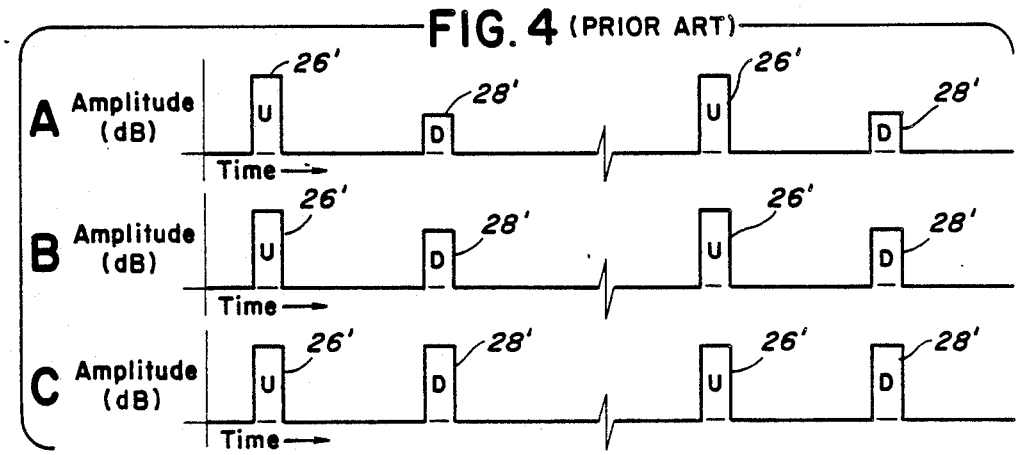
FIG. 4 (PRIOR ART)
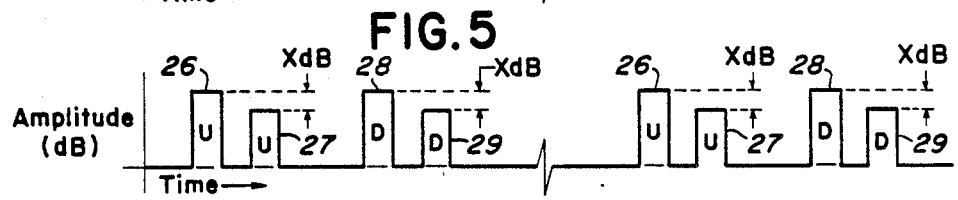
FIG. 5
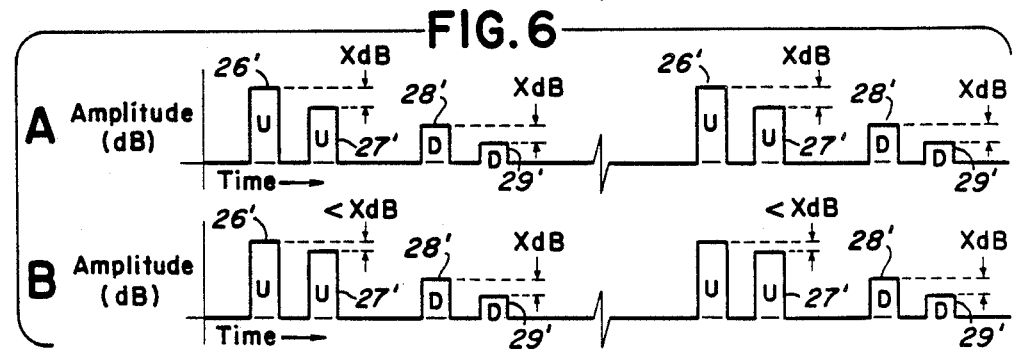
FIG. 6

METHOD AND APPARATUS FOR DETECTING RECEIVER COMPRESSION IN MULTIPLE LOBE GUIDANCE SYSTEMS

BACKGROUND OF THE INVENTION

1. Field of the Invention

This invention relates generally to a method and apparatus for detecting the occurrence of amplitude compression in receivers, and more particularly to a method and apparatus for detecting the occurrence of pulse compression in the receivers and pulse processors of aircraft guidance systems of the type that compare the amplitudes of received pulses to provide guidance information.

2. Background of the Invention

Approach guidance systems typically utilize a radio transmitter that alternately transmits pulses in overlapping beams. Such systems typically have two horizontally overlapping beams and two vertically overlapping beams to provide azimuth and elevation guidance information. A receiver in the aircraft receives the signals from the overlapping beams and compares the amplitudes of the pulses received from the various beams. When the pulses received from the left and right beams are equal in amplitude the aircraft is on the correct azimuth, and when the amplitudes of the pulses received from the up and down lobes of the elevation system are equal, the aircraft is on the correct glide slope.

While the above described system provides satisfactory operation under most circumstances, certain failures in the pulse receiving and processing circuitry aboard the aircraft can cause compression of pulses received from one of the beams relative to the others, and thus provide an erroneous reading to the pilot which could place the aircraft off course and result in a hazardous situation.

SUMMARY OF THE INVENTION

It is an object of the present invention to provide a guidance system for aircraft that overcomes many of the disadvantages of the prior art guidance systems.

It is another object of the present invention to provide a method and apparatus for detecting the occurrence of pulse compression in amplitude based guidance systems.

It is another object of the present invention to provide a pulse amplitude comparing approach guidance system for aircraft that includes apparatus for detacting the occurrence of pulse amplitude compression in the receiving and processing circuitry of the system.

Briefly, in accordance with the invention, the system utilizes a transmitting station that transmits pulses along at least two overlapping lobes. The pulses tramsitted along each lobe are transmitted with two different amplitudes, with a predetermined amplitude differential between the amplitudes of the pulses transmitted along each lobe. The pulse receiving and processing system aboard the aircraft compares the amplitudes of the pulses received from an individual lobe and if the difference between the amplitudes of the pulses is substantially equal to the predetermined differential between the transmitted pulses, pulses from the different lobes are compared to provide guidance information. If the difference in the amplitude between the pulses received from a single lobe is not equal to the amplitude differential of the pulses transmitted on that lobe, an indication of receiver compression is provided to the pilot to warn him that an invalid condition exists.

DESCRIPTION OF THE DRAWING

These and other objects and advantages of the present invention will become readily apparent upon consideration of the following detailed description and attached drawing, wherein:

FIG. 1 is a plan view of an aircraft runway showing the overlapping azimuth guidance beams of a typical system;

FIG. 2 is an elevational view of an aircraft runway showing a overlapping elevation guidance beams of a typical system;

FIG. 3 is a diagram illustrating the pulse sequence generated by a typical prior art approach guidance system;

FIG. 4 is a diagram illustrating the effects of pulse compression on the relative amplitudes of the received pulses;

FIG. 5 is a diagram illustrating the pulse sequence employed by the guidance system according to the present invention;

FIG. 6 is a diagram illustrating the effects of pulse amplitude compression on the pulses generated by the system according to the invention;

DETAILED DESCRIPTION

Figure 7:
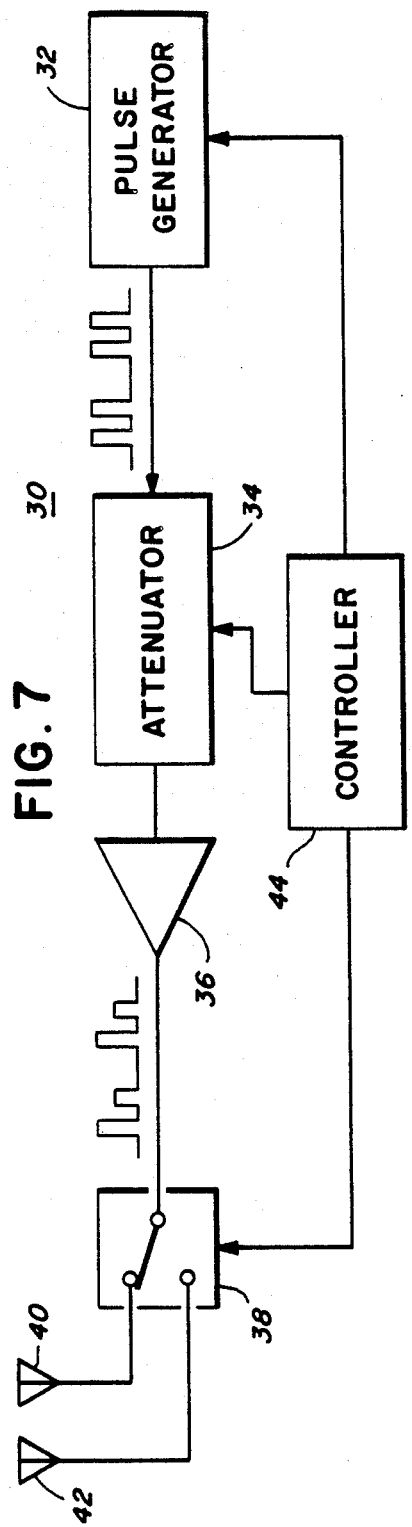
FIG. 7 is a block diagram of a transmitter suitable for use in a ground station of the system according to the present invention.

While the system according to the present invention may be utilized for any pulse amplitude comparison system that is sensitive to the effects of pulse amplitude compression during the receiving and processing of the pulses, it will be discussed in conjunction with an approach guidance system for aircraft because the effects of pulse compression in such a system can be particularly serious.

Referring to FIG. 1, there is shown a runway 10 equipped with an azimuth guidance system. AS shown, a typical azimuth guidance system utilizes a pair of antennas that transmit pulses in two overlapping beams illustrated by lobes 12 and 14 that overlap in an area 16. On approach, the system in the aircraft compares the amplitudes of the pulses received from the lobes 12 and 14. As long as the aircraft is on course with the runway centerline, the amplitudes of the pulses received from the lobes 12 and 14 will be approxmately equal. However, should be aircraft stray off course, the pulses received from one of the lobes 12 and 14 will be larger than those received from the other.

FIG. 2 illustrates the elevation guidance unit for the runway 10. The elevation guidance unit operates similarly to the azimuth unit except that the two beams are displaced vertically rather than horizontally. For example, the elevation unit in FIG. 2 has an upper lobe 20 and a lower lobe 22 that overlap in an area 24.

As in the case of the azimuth unit, as long as the aircraft is on course, i.e., on the proper glide slope, the amplitudes of the pulses received from the lobes 20 and 22 will be approximately equal. However, should the aircraft fly above or below the glide slope, the amplitudes of the pulses received from the two lobes will no longer be equal.

In a typical system, pulses transmitted on the two lobes of an elevation or azimuth guidance system are transmitted as pulse pairs. For example, as is illustrated in FIG. 3 for an elevation guidance system, a pulse pair consisting of an up pulse 26 followed by a down pulse 28 is repetitively transmitted. Ideally the amplitudes of the transmitted up pulse 26 and the transmitted down pulse 28 are equal so that when the aircraft is on course, the amplitudes of the pulses received will be equal, and an inequality of received pulses will indicate an off course condition. A typical azimuth ground station generates a pulse sequence similar to the one illustrated in FIG. 3 except that pairs of pulses consisting of a right pulse and a left pulse are repetitively generated.

As previously stated, when the aircraft is on course, the amplitudes of the pulses received from each of the azimuth and elevation units are substantially equal. In the event that it is off course, the amplitudes of the received pulses are different as is illustrated in FIG. 4A. FIG. 4A shows a pair of pulses 26' and 28' correspond to the transmitted pulses 26 and 28. The difference in amplitude between the pulses 26' and 28' indicate that the aircraft is off course, i.e., within the lobe 20 (FIG. 2) since the amplitude of the pulse 26' is greater than the amplitude 28'. The difference in amplitude is processed by the processing system aboard the aircraft to provide an indication to the pilot as to the magnitude and direction of his deviation from the desired course. A similar indication can be provided for both azimuth and elevation deviations.

In the event of a failure in the receiving and processing system, one of the received pulses could be compressed relative to the other. Examples of failures that can cause pulse compression include insufficient local oscillator drive to the mixer of the receiving front end and a malfunction of the automatic gain control circuit. For example, as is illustrated in FIG. 4B, the amplitude of the pulse 26' is compressed relative to the amplitude of the pulse 28'. Thus, while the system still provides an indication that the aircraft is off course, the magnitude of the deviation from the desired course that will be displayed will be less than the true deviation.

In some cases, the compression may be even more severe, as illustrated in FIG. 4C wherein the magnitudes of the pulses 26' and 28' appear to be equal. In such a situation, the displayed guidance signal would indicate to the pilot that he is on course when he is really considerably off course, thus resulting in a dangerous situation. Thus, it is desirable to provide a system for detecting the occurrence of pulse compression and to provide an indication of such an occurrence to the pilot so that he will be aware that the guidance system is not functioning properly.

In order to detect such a pulse compression, and in accordance with an important aspect of the present invention, the pulse train transmitted by the ground station is modified to include a second pulse following (or preceding) each pulse in each transmitted pulse pair. As is illusrated in FIG. 5, a second reduced amplitude pulse 27 is inserted following the pulse 26, and a second pulse 29 is inserted following the pulse 28. Although the addiitional pulses are shown inserted following the pulses of the signal shown in FIG. 5, they can also be inserted prior to each pulse in the pulse pair. What is of significance is that the inserted pulses 27 and 29 be of a different amplitude than the pulses 26 and 28 to provide a reference for detecting compression. The difference in amplitude between the pulses 26 and 27 and between the pulses 28 and 29 may be any detectable difference, for example 3 dB, and is illustrated as X dB in FIG.

The amplitude differential between the larger and smaller pulses provides a reference by which the compression of a larger pulse relative to a smaller pulse may be measured. If no compression occurs in the receiving and pulse processing circuitry, the relative magnitudes of the received pulses will be the same as those of the transmitted pulses as illustrated in FIG. 6A. In FIG. 6A, the received pulses 26', 27', 28' and 29' correspond to the corresponding transmitting pulses 26, 27, 28 and 29. As is illustrated in FIG. 6A, the amplitude differential of X dB is maintained, thus indicating that no compression has occurred.

In the event that there is a failure in the receiving and processing system and compression does occur, the amplitude differential between the various pulses will not be maintained. For example, as is shown in FIG. 6B, the amplitude differential between the pulses 26' and 27' is less than X dB, thus indicating that compression has occurred. When this occurs, an indication of an invalid condition is generated to warn the pilot of a malfunction.

A transmitter suitable for transmitting the pulse sequence according to the present invention is illustrated in FIG. 7 and generally designated by the reference numeral 30. The transmitting station 30 includes a pulse generator 32, an attenuator 34, an amplifier 36, a switching circuit 38, a pair of antennas 40 and 42 and a controller 44. To generate the desired pulse sequence to be transmitted, the pulse generator generates the paired pulses under the control of the controller 44. The pulses generated by the pulse generator 32 are bursts of radio frequency oscillations that may be of any suitable frequency, and in the present embodiment a frequency of 9.3 GHz is used. The pulses are applied to the attenuator 34 that attenuates one of the pulses in each pair and applies it to the amplifier 36 so that amplified pulses of unequal amplitude are applied to the switching circuit 38. The switching circuit 38 alternately applies the amplified signal to one of the antennas 40 and 42 under the control of the controller 44 so that successive pairs of pulses are coupled to different ones of the antennas 42 and 40.

The transmitted pulses may be generated in a variety of ways other than those shown in FIG. 7. For example, the antennas 40 and 42 are shown as being separate antennas, bu different driven elements of a single antenna may be emloyed. Also, the switching circuit 38 is illustrated as a simple single pole double throw switch, but various electronic switching circuits may be employed. In addition, the controller utilizes an attenuator to vary the amplitudes of the transmitted pulses. This may be accomplished in a variety of ways including changing the amplitude of the pulses generated by the pulse generator 32, or by varying the gain of the amplifier 36. In addition, while the attenuator 34 is shown to be ahead of the amplifier 36, it may be placed at the output of the amplifier 36, particularly if the amplifier 36 is nonlinear, or two attenuators may be used, one in series with each of the antennas 40 and 42.

Figure 8:
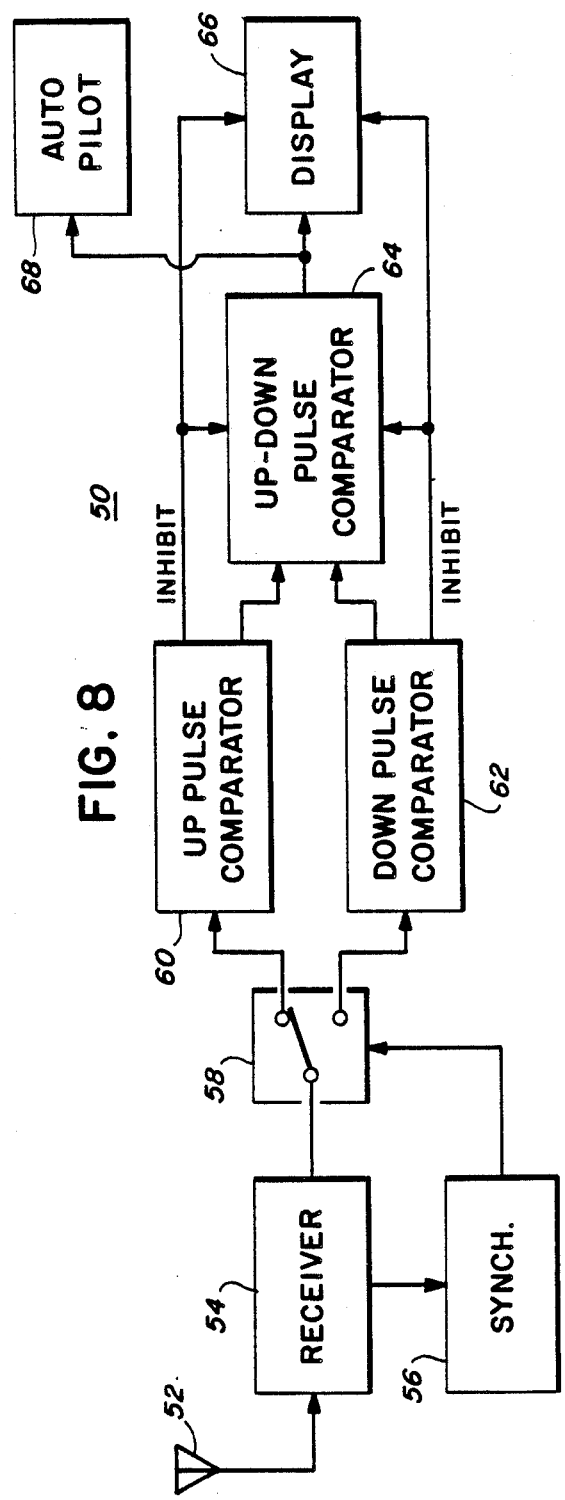
FIG. 8 is a block diagram of a pulse receiving and processing system usable in conjunction with the guidance system according to the invention.

A receiving and pulse processing system suitable for use with the system according to the invention may take several embodiments, and an illustrative embodiment is generally designated by the reference numeral 50 in FIG. 8. The receiving system 50 comprises an antenna 52, a receiver 54, both of which may be of conventional design, a synchronization circuit 56, a switching circuit 58, an up pulse comparator 60, a down pulse comparator 62, an up-down pulse comparator 64 and a display 66. If desired, the system may be used to control an auto pilot 68. A similar system would be utilized to receive azimuth signals.

In operation, signals are received by the antenna 52 by the receiver 54. The various pulses are preceded by a multiple pulse code, e.g., four pulses (not shown), that are digitally encoded in a conventional fashion to indicate whether up pulses, down pulses, left pulses or right pulses are to follow. The pulses are decoded by the receiver 54 and the synchronization circuit 56 and the output of the synchronization circuit 56 controls the switching circuit 58 to route the pulses to their appropriate comparators. For example, assming that the system 50 is used in an elevation guidance system, the up pulses would be routed to the up pulse comparator 60 and the down pulses would be routed to the down pulse comparator 62.

The function of the up pulse comparator is to monitor the up pulses and to determine whether the differential between the up pulses 26' and 27' is maintained. The down pulse comparator serves the same function for the down pulses 28' and 29'. A similar comparison would be made in an azimuth signal receiving unit.

If the amplitude differentials between the up pulses and the down pulses are proper, for example, X dB, the up pulses and down pulses are applied to the up-down pulse comparator 64. The function of the up-down pulse comparator 64 is to determine the relative amplitudes of the up and down pulses to provide location information, i.e., in the system of FIG. 8, the aircraft deviation above or below the glide slope. Either one or both of the pulses may be compared depending on whether a simple or a sophisticated system is desired. The results of the comparison are scaled and displayed on the display 66 which may be conventional glide slope display, and can also be used to control the auto pilot 68. A similar comparison would be made in an azimuth signal receiving unit.

In the event of a failure that results in pulse compression, the relative amplitudes of the up pulses or of the down pulses will not be maintained. Such a condition is detected by either the up pulse comparator 60 or the down pulse comparator 62 which generates an invalid or an inhibit signal which is applied to the up-down pulse comparator and to the display (FIG. 8). In the event of such an invalid condition, the up-down pulse comparator is inhibited, to prevent erroneous information from being displayed, and an indication is displayed on the display 66 to illustrate to the pilot that a failure has occurred. A similar system may be used for the azimuth system.

As in the case of the transmitted shown in FIG. 7, various configurations of a suitable receiving and processing circuit may be utilized, with the particular embodiment illustrated in FIG. 8 being shown for illustrative purposes only.

Obviously, many modifications and variations of the present invention are possible in light of the above teachings. Thus it is to be understood that, within the scope of the appended claims, the invention may be practiced otherwise than as specifically described above.

What is claimed and desired to be secured by Letters Patent of the United States is:

1. A multiple beam guidance system comprising:
   means for transmitting a plurality of pulses on each of a plurality of overlapping directional beams, with the pulses transmitted on each beam having two different amplitudes with a predetermined amplitude differential therebetween; and
   means for receiving pulses from said plurality of beams and comparing the amplitudes of pulses from different beams to provide a guidance signal, said receiving and comparing means including means for comparing the amplitudes of pulses received from an individual beam and generating a compression indication if the difference therebetween is not substantially equal to the predetermined amplitude differential between the amplitudes of the transmited pulses.

2. A method for providing guidance information comprising:
   transmitting pulses having two different amplitudes along each of two offset directional beams, the difference in amplitudes of the pulses transmitted along each beam being equal to a predetermined amplitude differential;
   receiving the pulses from the two beams;
   comparing the amplitudes of the pulses from the two beams to provide guidance information; and
   comparing the amplitudes of the pulses received from an individual beam to provide an indication of an invalid condition if the difference therebetween is not substantially equal to the predetermined amplitude differential.

3. An approach guidance system for aircraft, comprising:
   a ground station having means for transmitting pulses of radio frequency energy along two overlapping directional beams, with the pulses transmitted along each of the two beams having two different amplitudes and a predetermined amplitude differential therebetween; and
   an airborne system having means for receiving the pulses transmitted on each of the two beams and comparing the amplitudes of the pulses received on one of the two beams with the amplitudes of pulses received on the other one of the two beams to provide a guidance signal, said airborne system further including means for comparing the amplitudes of pulses received on an individual one of the beams and generating an indication of an invalid condition if the difference in amplitude between the two different amplitude pulses is not substantially equal to the predetermined differential.

4. A multiple beam fixed guidance system comprising:
   a plurality of directional fixed beam antennas having overlapping lobes;
   means for transmitting a plurality of pulses on each of said plurality of overlapping directional fixed antennas, with the pulses transmitted on each antenna having two different amplitudes with a predetermined amplitude differential therebetween; and
   means for receiving pulses from said plurality of fixed beam antennas and comparing the amplitudes of pulses from different fixed beam antennas to provide a guidance signal, said receiving and comparing means including means for comparing the amplitudes of pulses received from an individual fixed beam antenna and generating a compression indication if the difference therebetween is not substantially equal to the predetermined amplitude differential between the amplitudes of the transmitted pulses.

5. A method of providing guidance information comprising:
   transmitting pulses having two different amplitudes by each of two offset directional fixed beam antennas, the difference in amplitudes of the pulses transmitted by each fixed beam antenna being equal to a predetermined amplitude differential;
   receiving the pulses from the two fixed beam antennas;
   comparing the amplitudes of the pulses from the two fixed beam antennas to provide guidance information; and
   comparing the amplitudes of the pulses received from an individual fixed beam antenna to provide an indication of an invalid condition if the difference therebetween is not substantially equal to the predetermined amplitude differential.

6. An approach guidance system for aircraft comprising:
   a ground station having two fixed beam directional antennas having overlapping lobes and means for transmitting pulses of radio frequency energy by the two fixed beam antennas along two overlapping directional beams, with the pulses transmitted along each of the two beams having two different amplitudes and a predetermined amplitude differential therebetween; and
   an airborne system having means for receiving the pulses transmitted on each of the two beams and comparing the amplitudes of the pulses received on one of the two beams from one of the antennas with the amplitudes of pulses received on the other one of the two beams from the other antenna to provide a guidance signal, said airborne system further including means for comparing the amplitudes of pulses received on an individual one of the beams from an individual one of the antennas and generating an indication of an invalid condition if the difference in amplitude between the two different amplitude pulses is not substantially equal to the predetermined differential.

* * * * *